United States Patent
Leisse et al.

(10) Patent No.: US 9,090,204 B2
(45) Date of Patent: Jul. 28, 2015

(54) HOLDER ARRANGEMENT OF A LIGHT MODULE IN THE HOUSING OF A HEADLAMP

(71) Applicant: Hella KGaA Hueck & Co., Lippstadt (DE)

(72) Inventors: Winfried Leisse, Ingolstadt (DE); Ralf Seiger, Lippstadt (DE); Norbert Röhr, Lippstadt (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 71 days.

(21) Appl. No.: 14/086,704

(22) Filed: Nov. 21, 2013

(65) Prior Publication Data
US 2014/0146550 A1    May 29, 2014

(30) Foreign Application Priority Data
Nov. 23, 2012   (DE) .......................... 10 2012 111 311

(51) Int. Cl.
*B60Q 1/068*    (2006.01)
*B60Q 1/04*     (2006.01)
*F21S 8/10*     (2006.01)

(52) U.S. Cl.
CPC ............ *B60Q 1/0683* (2013.01); *B60Q 1/0433* (2013.01); *B60Q 1/0686* (2013.01); *F21S 48/1742* (2013.01)

(58) Field of Classification Search
CPC ...... B60Q 1/00; B60Q 1/0433; B60Q 1/0683; B60Q 1/0686; B60Q 1/068; F21S 8/10; F21S 48/00; F21S 48/10; F21S 48/25; F21S 48/255; F21S 48/1742
See application file for complete search history.

(56) References Cited

U.S. PATENT DOCUMENTS

| | | | |
|---|---|---|---|
| 7,284,887 B2 * | 10/2007 | Fladhammer | 362/515 |
| 8,439,544 B2 * | 5/2013 | Seiger | 362/548 |
| 2007/0053196 A1 * | 3/2007 | Fladhammer | 362/528 |
| 2012/0320619 A1 * | 12/2012 | Tillmann et al. | 362/538 |

* cited by examiner

*Primary Examiner* — Bao Q Truong
(74) *Attorney, Agent, or Firm* — Husch Blackwell LLP

(57) ABSTRACT

A holder arrangement of a light module in the housing of a headlamp includes a headlamp leveling actuator being arranged between the light module and the housing for the adjustment of the position of the light module in the housing, wherein the position of the headlamp leveling actuator can be changed in the housing by means of an adjustment device. The adjustment device may include a connecting link which is embodied for the compensation of thermally induced changes of the position of the light module in the housing of the headlamp.

16 Claims, 3 Drawing Sheets

HOLDER ARRANGEMENT OF A LIGHT MODULE IN THE HOUSING OF A HEADLAMP

CROSS REFERENCE

This application claims priority to German Patent Application No. 10 2012 111311.4, filed Nov. 23, 2012.

TECHNICAL FIELD OF THE INVENTION

The present invention relates to an holder arrangement of a light module in the housing of a headlamp as well as a headlamp with a respective installation device.

BACKGROUND OF THE INVENTION

Headlamp leveling actuators can be actuated for example electrically and serve the correction of the light being emitted by the light module of the headlamp, e.g. in case of a change of position of the vehicle. Herein, the headlamp leveling actuator tracks the movement of the vehicle so that the light module in the housing of the headlamp is temporarily or permanently in motion. Herein, the headlamp leveling actuator embodies a connecting link for at least one connection point of the light module in the housing of the headlamp, and position changes of the headlamp leveling actuator in the housing can be made by means of the adjustment device for adjustment purposes, which do also lead to a change in the distribution direction of the light emitted by the light module.

For the position of the cut-off line of the low beam of a headlamp, a high degree of accuracy is for example required in the vertical direction. If, for example, the alignment of the light module in the vertical direction changes by less than 1°, the cut-off line may, at a distance of 10 m, already have a deviation of more than 10 cm in the vertical direction. Hence, the holder arrangement of the light module in the housing must be executed very accurately, and despite the adjustment by means of the adjustment device, thermal expansion could occur, which inadmissibly displaces the light module in the housing.

DE 10 2010 048 989 A1, for example, shows a holder arrangement of a light module in the housing of a headlamp with a headlamp leveling actuator being held in a carriage element being embodied in a special manner in the housing of the headlamp, so that tilting of the carriage element effects the position of the light module in the housing of the headlamp as little as possible. Herein, it is also mentioned that the play between the guiding pegs and the guiding profiles between the carriage element and the housing in the headlamp can be unfavorably influenced by occurring marches of temperature, which in turn also has a negative influence on the positional accuracy of the light module in the housing.

The holder arrangement of the light module in the housing can for example form an upper connection point of the light module in the housing, via which the light module is fastened to the lower side of the light module in addition to two further connection points. If the holder arrangement, for example the headlamp leveling actuator, expands due to a rise in temperature, the light module in the housing of the headlamp can tip into the driving direction, causing the cut-off line to sink. If the holder arrangement and in particular the headlamp leveling actuator contracts due to a temperature decrease, for example due to low external temperatures, the light module tips against the driving direction, and the cut-off line can move upwards in an inadmissible manner The headlamp leveling actuator is held in the housing of the headlamp via the adjustment device which can be operated manually once during the setting of the headlamp or during maintenance work to return the headlamp leveling actuator into the required position. This does not offer the possibility of a correction of transient, thermally caused changes to the position of the headlamp leveling actuator and therefore of the light module in the housing of the headlamp by means of the adjustment device.

From DE 10 2010 009 283 A1, an holder arrangement of a light module in the housing of a headlamp is known, which is embodied as a rigid reception point of the light module in the housing of the headlamp and which comprises a ball head around which the position of the light module can be changed. To compensate for thermally induced position changes of the reception point in the housing of the headlamp, expansion elements are proposed, which can be connected via extension lengths that are variable relative to one another, to compensate for thermally induced form changes of the housing, but also of the reception element itself. A change of the position of a headlamp leveling actuator due to thermal changes in the headlamp, however, cannot be corrected in a simple manner by such a thermo-compensation arrangement.

SUMMARY OF THE INVENTION

The task of the present invention is, therefore, to propose a holder arrangement for a light module in the housing of a headlamp, comprising a headlamp leveling actuator and an adjustment device, and which allows a compensation of thermally induced changes of the position of the light module in the housing of the headlamp in a simple manner.

This task is solved based on a holder arrangement for a light module in the housing of a headlamp. Advantageous further developments of the invention are stated in the dependent claims.

The invention includes the technical teaching, that the adjustment device comprises a connecting link being developed for the compensation of thermally induced changes to the position of the light module in the housing of the headlamp.

Examinations have shown, that a compensation of thermally induced changes to the position of the light module in the housing of the headlamp can be achieved in a particularly advantageous manner by using a respective connecting link as part of the adjustment device, so that for the compensation of thermally induced changes to the position of the light module in the housing, the connecting link acts like a manual readjustment of the headlamp leveling actuator by the adjustment device. The headlamp leveling device is usually held in the housing of the light module by a carriage, and if the temperature in the headlamp and the components participating in the positioning of the light module changes, for example due to changing external temperatures or to the operation of the light source in the headlamp, the connecting link of the adjustment device compensating the accompanying thermal expansion executes readjustment by means of a movement of the headlamp leveling actuator in the carriage of the housing, as is also done by manual manipulation of the adjustment device. This results in the particular advantage, that the operation of the headlamp leveling device is not influenced by the arrangement of the connecting link for thereto-compensation as part of the adjustment device.

Thermo-compensation takes place in an advantageous manner between the headlamp leveling actuator and the housing in the upper installation space of the headlamp, wherein the adjustment device with the connecting link for thermo-compensation can be arranged in an installation area of the headlamp which is under the direct influence of thermal changes causing a change of the position of the light module in the headlamp. By this means, thermo-compensation can effectively take place, the further advantage being achieved, that no essential design-changes of existing arrangements for headlamp leveling are to be provided. Such a thermo-sensitive position is not given in the lower installation area of the housing of the headlamp, for example.

According to a further advantageous embodiment of the invention, the connecting link can be embodied for the coupling to the headlamp leveling actuator, wherein the connecting link can be coupled to the headlamp leveling actuator in at least two different positions. In the different positions, the connecting link can compensate for a thermally caused deviation of position of the light module in the headlamp in various directions.

For example, the connecting link can effect a correction in a first position on the headlamp leveling actuator, which tilts the light module in the housing of the headlamp in the driving direction, and the same connecting element can effect, for example, in a reverse, second position a correction tilting the light module in the housing of the headlamp against the driving direction of the vehicle, whenever the temperature in the headlamp rises to the same extent in both cases.

The adjustment device can comprise a threaded rod and the connecting link can comprise a female thread, wherein the threaded rod is attachable to the female thread. The female thread can comprise an open side into which the threaded rod of the adjustment device can be snapped. If the threaded rod is, for example, rotated by means of manual operation, the female thread and therefore the connecting link moves up and down on the threaded joint in the longitudinal direction according to a spindle-nut principle.

Herein, the connecting link comprises a thermo-compensation section, which expands when the temperature rises and contracts when the temperature sinks. The thermo-compensation section is herein situated between the female thread and the coupling to the headlamp leveling actuator, so that the power transmission point, which can be defined between the threaded rod and the female thread, can wander relative to the headlamp leveling actuator in case of a thermal change. With reference to the longitudinal direction of the threaded rod, the thermo-compensation section of the connecting link can, depending on the position in which the connecting link is coupled to the headlamp leveling actuator, be aligned in a pushing or in a dragging arrangement relative to the threaded rod.

With a further advantage, it can be provided that with the arrangement of the connecting link on the threaded rod, the thermo-compensation section extends in the same direction as the longitudinal direction of the threaded rod. If the thermo-compensation section of the connecting link expands during a temperature rise, a displacement of the headlamp leveling actuator is generated, causing the light module in the housing of the headlamp to tip for example forward in the driving direction. If the thermo-compensation section contracts due to a temperature drop, the light module in the housing of the headlamp can tip, for example, against the driving direction. Herein, the tipping of the light module into the driving direction and against the driving direction caused by the thermo-compensation section corresponds to the tipping that could be achieved by manually rotating the threaded rod.

According to a further advantageous embodiment of the connecting link, the thermo-compensation section can have a spring tab in or on the connecting link, which can be connected to the headlamp leveling actuator with its free end. The free end of the spring tab can have a connecting peg which can be snap-locked into several peg-receptions being arranged on the headlamp leveling actuator by means of elastic spring movement of the spring tab. The connecting link can be held in a guide with guiding tongues and guiding grooves on the headlamp leveling element, and if the connecting peg is pulled back under elastic spring movement, the connecting link can be slid in the guide on the headlamp leveling actuator until the connecting peg is engaged in a respective peg seat on the headlamp leveling actuator. Subsequently, the spring tab can achieve by means of its elastic recovery that the connecting peg engages play-free in the peg seat. On the headlamp leveling actuator, there are preferably several peg seats added, and by sliding the connecting link in the carriage-type guide of the guiding tongues in the guiding grooves, the connecting peg can snap-fastened in the desired peg seat. As an alternative to a connecting peg snap-fastening into a peg seat, the connection between the end of the thermo-compensation section and the headlamp leveling actuator can also be embodied as a bajonet joint, a screw joint or a welded joint.

The embodiment of the adjustment device according to the invention with a connecting link for thermo-compensation allows the particular advantage, that various connecting links with varying thermo-compensation sections can be arranged between the threaded rod and the headlamp leveling actuator. Depending on the geometric designs, the general embodiment of the headlamp and of further components, and in particular of the headlamp leveling actuator, it can be decided during the assembly of the headlamp, which connecting link shall be provided as a component of the adjustment device between the threaded rod and the headlamp leveling actuator. Advantageously, a change or adaptation of the adjustment device and/or the headlamp leveling actuator for the reception of various connecting links is herein not required. The connecting links can differ particularly in various embodiments of thermo-compensation sections, causing for example different directions and/or corrections of differing strengths with regard to the position of the light module in the housing of the headlamp.

Furthermore, the invention relates to a headlamp with a holder arrangement for the reception of a light module in the housing of a headlamp, comprising a headlamp leveling actuator being arranged between the light module and the housing for the adjustment of the position of the light module in the housing, wherein the position of the headlamp leveling actuator can be changed in the housing by means of an adjustment device. According to the invention it is envisaged, that the adjustment device comprises a connecting link which is embodied for the compensation of thermally induced changes of the position of the light module in the housing (10) of the headlamp. The further characteristics described in connection with the holder arrangement and assigned advantages for the headlamp according to the invention do of course also find consideration.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1A:
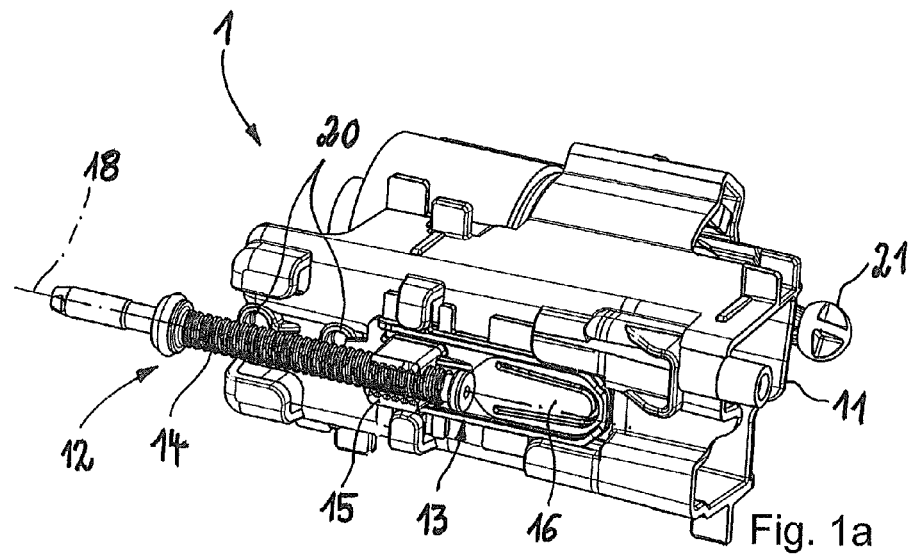
FIG. 1a An embodiment of a holding device with a connecting link of a first embodiment and in a first arrangement, FIG. 1b the embodiment of the holding device according to Figure 1a in an exploded view, FIG. 2a an embodiment of the holding device with the connecting link of the first embodiment in a second, reverse arrangement on the headlamp leveling actuator 11, FIG. 2b the embodiment of the holding device according to FIG. 2a in an exploded view, FIG. 3a a further embodiment of the holding device with a connecting link of a second embodiment and FIG. 3b the embodiment of the holding device according to FIG. 3a in an exploded view.
Figure 1B:
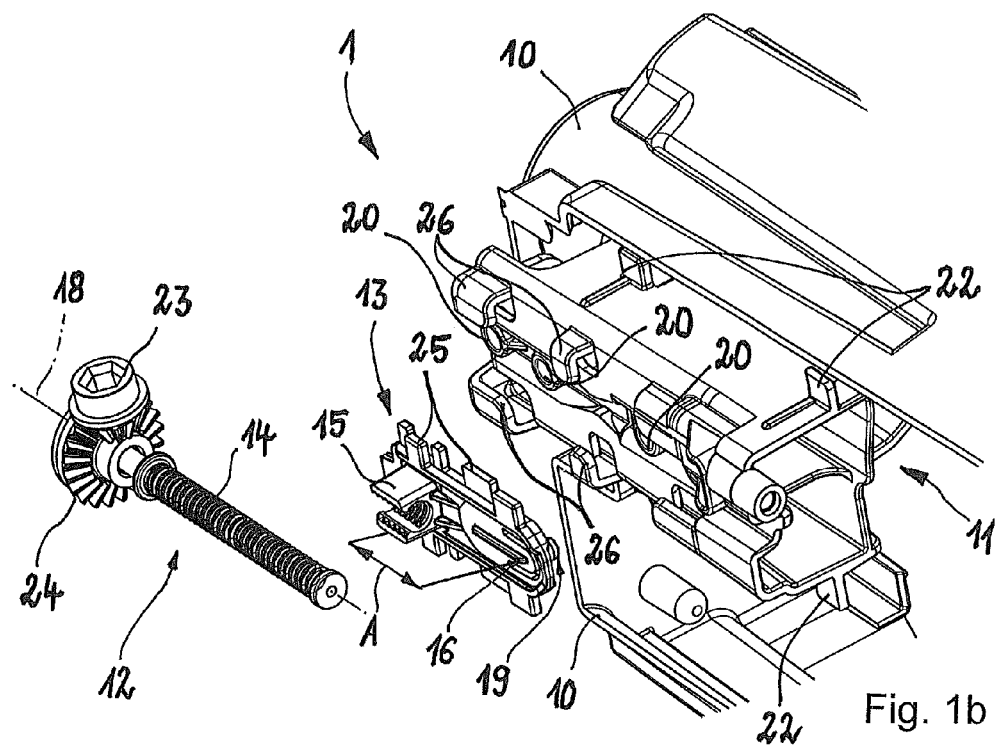

In FIGS. 1a and 1b, a first embodiment of a holder arrangement 1 of a light module in the housing 10 of a headlamp is shown, wherein FIG. 1a shows the holder arrangement 1 in a mounted condition, and FIG. 1b shows the holder arrangement 1 in an exploded view. The holder arrangement 1 comprises a headlamp leveling actuator 11 which can be operated electrically to adjust the position of the light module in the housing 10 of the headlamp. To this end, the light module is coupled to a light module coupling 21, which can drive into and out of the headlamp leveling actuator 11 by means of an electric motor, thus changing the position of the light module in the housing 10 of the headlamp. The headlamp leveling actuator 11 is held in a guide arrangement in the housing 10 of the headlamp, wherein the guide arrangement comprises guiding lugs 22 being arranged on the headlamp leveling actuator 11 and slidable in a manner not described in detail, in a longitudinal guide of the housing 10, wherein the housing 10 partially encompasses the headlamp leveling actuator in the section shown.

For an adjustment of the position of the headlamp leveling actuator 11, an adjustment device 122 is provided, which can be operated manually, so that the headlamp leveling actuator 11 can be adjusted in the position in the housing 10. To this end the adjustment device 12 has a recess for tools 23, which ran be rotated by an operator with a tool. The rotation is transmitted via a toothed wheel 24 onto a threaded rod 14 of the adjustment device 12, so that the latter rotates in the indicated longitudinal direction 18.

The threaded rod 14 is held in a female thread 15 being molded to a connecting link 13. If the threaded rod 14 rotates in the longitudinal direction 18, the female thread 15 wanders along the longitudinal direction 18, so that the connecting link 13 is displaced in the longitudinal direction 18. If the connecting link 13 is arranged in the headlamp leveling actuator 11, the displacement is transferred to the latter, so that as a result, the light module coupling 21 in form of the shown ball head is also displaced in the longitudinal direction 18 of the threaded rod 14. Herein, the displacement of the light module coupling 21 by means of a manual operation of the adjustment device 12 corresponds to the same displacement of the light module coupling 21 in the same direction, such as can be created when the headlamp leveling actuator 11 is activated, to change the position of the light module within the housing 10 of the headlamp.

The connecting link 13 has a thermo-compensation section 16, which is embodied in the manner of a spring tab on the connecting link 13 and which comprises at its end a connecting peg 19, which can be snap-fastened to one of the shown peg seats 20 on the headlamp leveling actuator 11. The connecting link 13 has guiding tongues 25, which are held in a slidable manner in the guiding grooves 26 being fitted on the headlamp leveling actuator 11. This allows a correcting displacement of the connecting link 13 on the headlamp leveling actuator 11, which can be generated by the thermo-compensation section 16 of the connecting link 13. Herein, the thermo-compensation section 16 forms a longitudinal expansion section, which can change within the shown first compensation length A upon a temperature change. Subsequently, a slight displacement of the female thread 15 on the connecting link 13 is generated relative to the headlamp leveling actuator 11, if the temperature in the headlamp changes, wherein by means of the displacement, an inadmissible displacement of the light module in the headlamp is compensated.

If the connecting link 13 is arranged in the represented position on the headlamp leveling actuator 11, the compensation length A lengthens the connection length of the threaded rod 14. This results in a pushing arrangement of the thermo-compensation section 16 on the connecting link 13 between the threaded rod 14 and the headlamp leveling actuator 11. If for example the threaded rod 14 expands due to a rise in temperature, the thermo-compensation section 16 will also expand. By this means, the light module coupling 21 can be moved forward in the direction of the light module, thus a thermal expansion of the housing of the headlamp working in the opposite direction can be compensated.

Figure 2A:
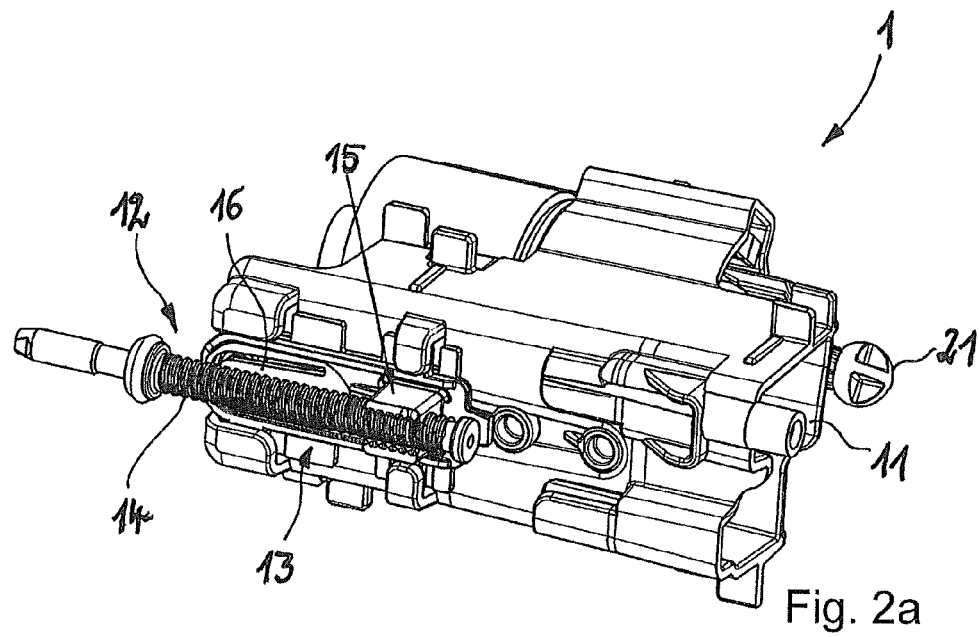
Figure 2B:
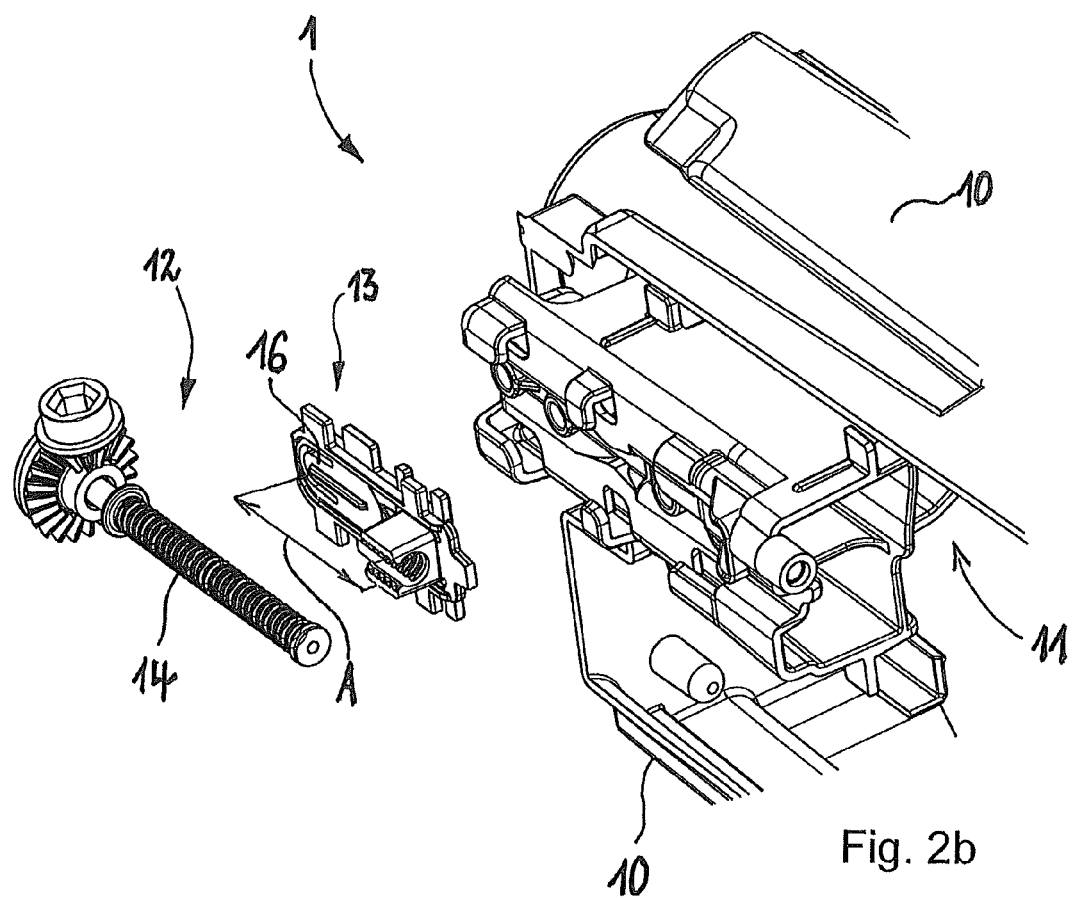

FIGS. 2a and 2b show a further embodiment of the holder arrangement 1 with the headlamp leveling actuator 11, onto which the light module can be coupled by means of the light module coupling 21. The connecting link 13 of the adjustment device 12 is shown in a rotated arrangement between the threaded rod 14 and the female thread 15 so that the connecting link 13 is snap-fastened to the threaded rod 14 via the female thread 15 in a manner, that the thermo-compensation section 16 of the connecting link 13 extends in the opposite direction of the extension of the threaded rod 14. By this means, a compensation of a thermal expansion of the threaded rod 14 is achieved, as the connecting link 13 is arranged in a dragging arrangement on the threaded rod 14 in the shown modified arrangement. Herein, the connecting link 13 can be embodied identically with the shown connecting link 13 in the embodiment in FIG. 1a, 1b, and the connecting link 13 has the same compensation length A of the thermo-compensation section 16.

Figure 3A:
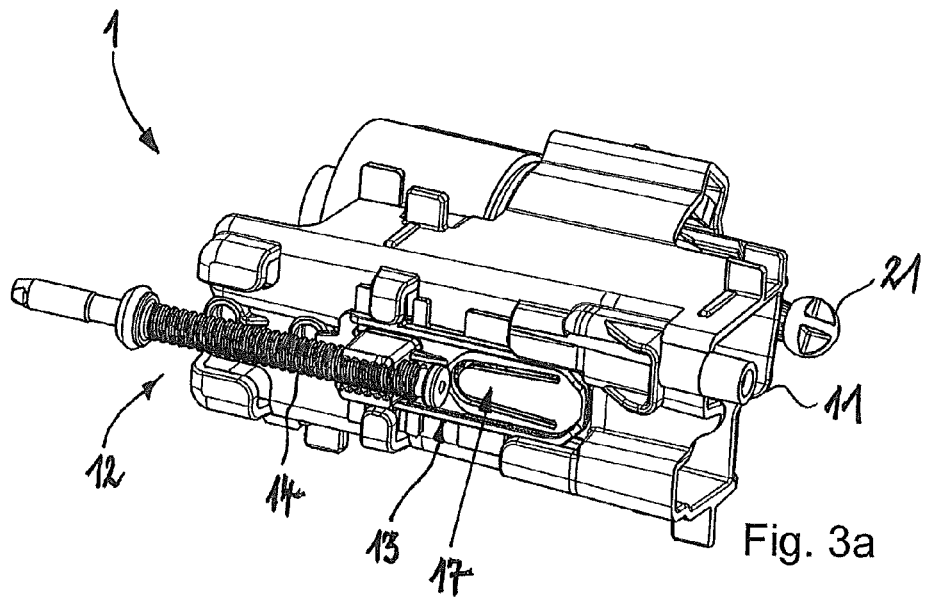
Figure 3B:
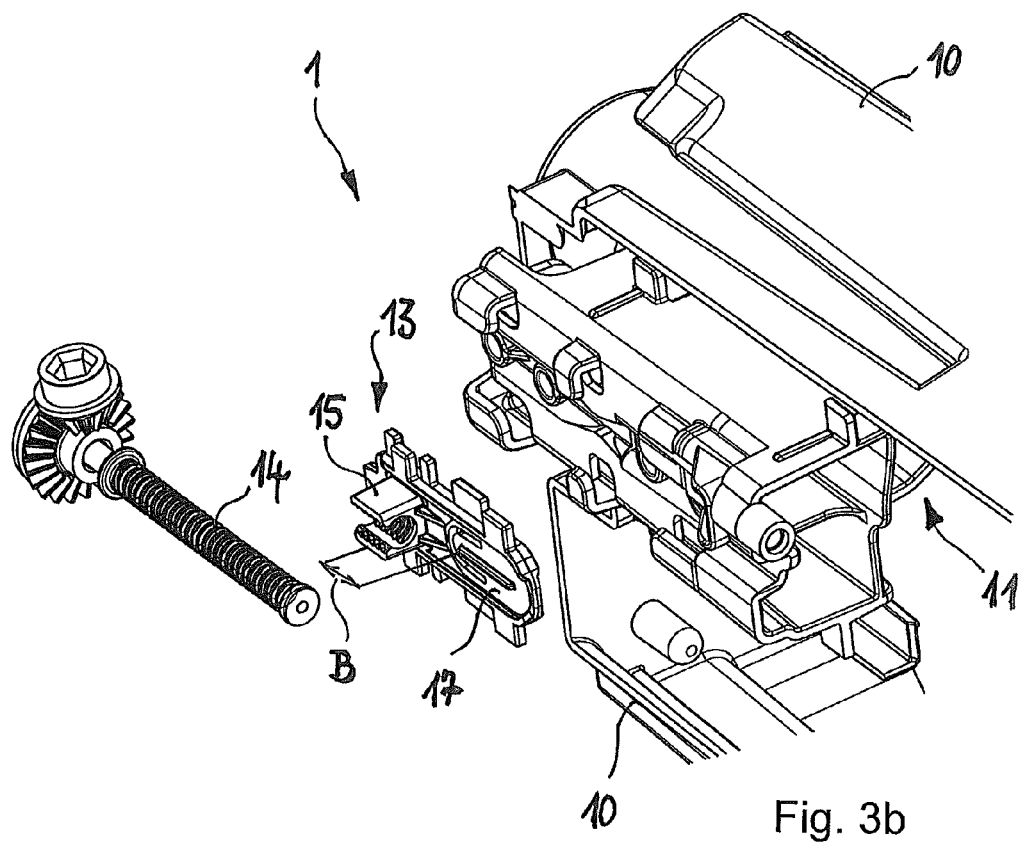

FIGS. 3a and 3b show a further embodiment of a holder arrangement 1 with a headlamp leveling actuator 11 in a mounted view and in an exploded view, being movably arranged in the housing 10 of the headlamp by means of an adjustment device 12. A modified connecting link 13 is shown in a further embodiment having a thermo-compensation section 17 with a second compensation length B. Herein, the compensation section 17 is also embodied in the manner of a spring tab, pointing in the direction of the female thread 15, however, so that the second compensation length B is shorter than the compensation length A of the thermo-compensation section 16 shown in the embodiments in the FIGS. 1a, 1b, 2a and 2b. Therefore, a smaller compensation effect is achieved by the variant of the connecting link 13 with an identical thermal change, the selection of the connecting link 13 depending for example on the complete design of the holder arrangement 1 respectively of the headlamp.

Also the connecting link 13 can, of course, be arranged according to the second embodiment with the compensation length B in a further, rotated arrangement between the threaded rod 14 and the female thread 15, as has already been shown in connection with the connecting link 13 of the first embodiment in the FIGS. 2a, 2b and 3a, 3b, and the connecting link 13 according to the FIGS. 3a and 3b can also be arranged in various positions on the headlamp leveling actuator 11.

In its embodiment, the invention is not limited to the preferred embodiments described above. Rather, a number of variants is conceivable, which uses the represented solution also in fundamentally different embodiments. All characteristics and/or advantages arising from the claims, the description or the drawings, including design details, spatial arrangement and process steps, either on their own or in the most different combinations, can be essential for the invention. In particular the connecting link 13 of the adjustment device 12 can be made from a material having a larger thermal expansion coefficient than the other components forming the adjustment device 12 and/or the headlamp leveling actuator 11, so that the thermo-compensation effect is increased. For example the connecting link 13 can be made from PBT (polybutadiene terephthalate) with or without glass fiber reinforcement (GF). Herein, the connecting link 13 can even be embodied as a composite material component, so that the thermo-compensation section 16, 17 comprises the special material with a large thermal, longitudinal expansion coefficient, while the basic structure of the connecting link 13 comprises a common material (e.g. POM).

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

REFERENCE SIGN LIST

1 Holder arrangement
10 Housing
11 Headlamp leveling actuator
12 Adjustment device
13 Connecting link
14 Threaded rod
15 Female thread
16 Thermo-compensation section
17 Thermo-compensation section
18 Longitudinal direction of the threaded rod
19 Connecting peg
20 Peg seat
21 Light module coupling
22 Guiding lug
23 Recess for tools
24 Toothed wheel
25 Guiding tongue
26 Guiding groove
A first compensation length
B second compensation length

The invention claimed is:

1. A holder arrangement of a light module in a housing of a headlamp, comprising
a headlamp leveling actuator being arranged between the light module and the housing for adjustment of a position of the light module in the housing,
an adjustment device operable for changing a position of the headlamp leveling actuator in the housing,
wherein the adjustment device further comprises a connecting link operable for compensation of thermally induced changes of the position of the light module in the housing of the headlamp.

2. The holder arrangement according to claim 1, wherein the connecting link is connected with the headlamp leveling actuator in one of at least two different positions.

3. The holder arrangement according to claim 1, wherein the adjustment device further comprises a threaded rod and the connecting link comprises a female thread, wherein the female thread is connected to the threaded rod in one of two directions.

4. The holder arrangement according to claim 1, wherein the connecting link further comprises a thermo-compensation section.

5. The holder arrangement according to claim 4, wherein the adjustment device further comprises a threaded rod and wherein the thermo-compensation section is aligned in the same direction as a longitudinal direction of the threaded rod when the connecting link is arranged on the threaded rod.

6. The holder arrangement according to claim 4, wherein the thermo-compensation section comprises a spring tab operable for connection with the headlamp leveling actuator with a free end thereof.

7. The holder arrangement according to claim 6, wherein the free end of the spring tab has a connecting peg operable to be snap-locked into several peg-receptions arranged on the headlamp leveling actuator through elastic spring deflection.

8. The holder arrangement according to claim 4, wherein the adjustment device further comprises a threaded rod and further comprising at least a second connecting link and wherein the connecting links are provided with differing thermo-compensation sections are arranged between the threaded rod and the headlamp leveling actuator.

9. A headlamp with a holder arrangement for the reception of a light module in the housing of the headlamp, comprising
a headlamp leveling actuator being arranged between the light module and the housing for the adjustment of the position of the light module in the housing,
an adjustment device operable for changing the position of the headlamp leveling actuator in the housing,
wherein the adjustment device comprises a connecting link operable for the compensation of thermally induced changes of the position of the light module in the housing of the headlamp.

10. The headlamp according to claim 9, wherein the connecting link is connected with the headlamp leveling actuator in one of at least two different positions.

11. The headlamp according to claim 9, wherein the adjustment device further comprises a threaded rod and the connecting link comprises a female thread, wherein the female thread is connected to the threaded rod in one of two directions.

12. The headlamp according to claim 1, wherein the connecting link further comprises a thermo-compensation section.

13. The headlamp according to claim 12, wherein the adjustment device further comprises a threaded rod and wherein the thermo-compensation section is aligned in the same direction as a longitudinal direction of the threaded rod when the connecting link is arranged on the threaded rod.

14. The headlamp according to claim 12, wherein the thermo-compensation section comprises a spring tab operable for connection with the headlamp leveling actuator with a free end thereof.

15. The headlamp according to claim 14, wherein the free end of the spring tab has a connecting peg operable to be snap-locked into several peg-receptions arranged on the headlamp leveling actuator through elastic spring deflection.

16. The headlamp according to claim 12, wherein the adjustment device further comprises a threaded rod and further comprising at least a second connecting link and wherein the connecting links are provided with differing thermo-compensation sections are arranged between the threaded rod and the headlamp leveling actuator.

\* \* \* \* \*